March 17, 1931. LA MAR BRESEE 1,796,918
CONVERTIBLE COUPÉ
Filed June 18, 1928   3 Sheets-Sheet 1
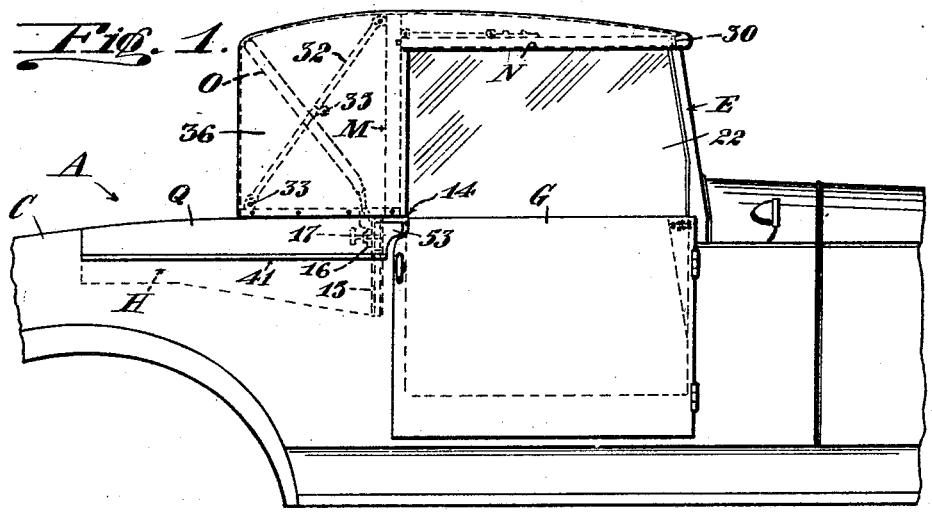
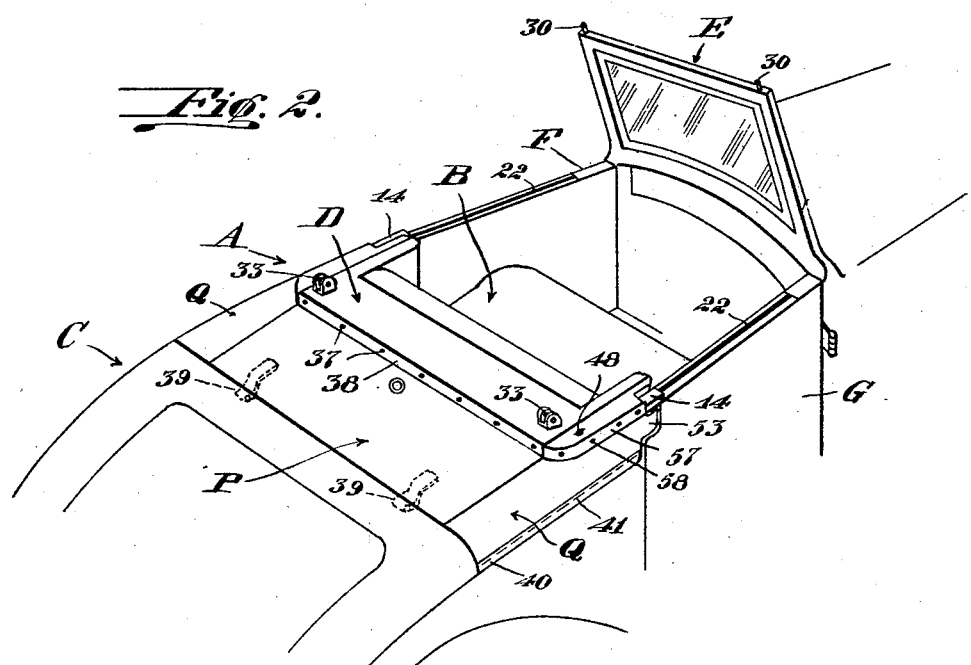
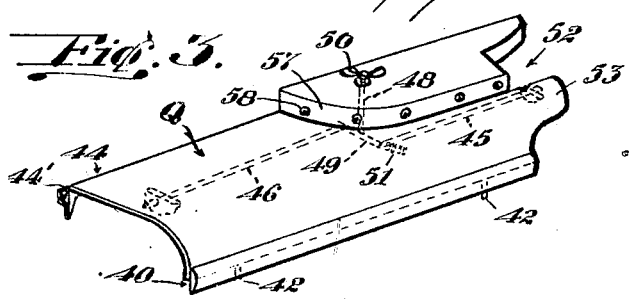
Inventor
LaMar Bresee,
By R. S. Berry
Att'y.

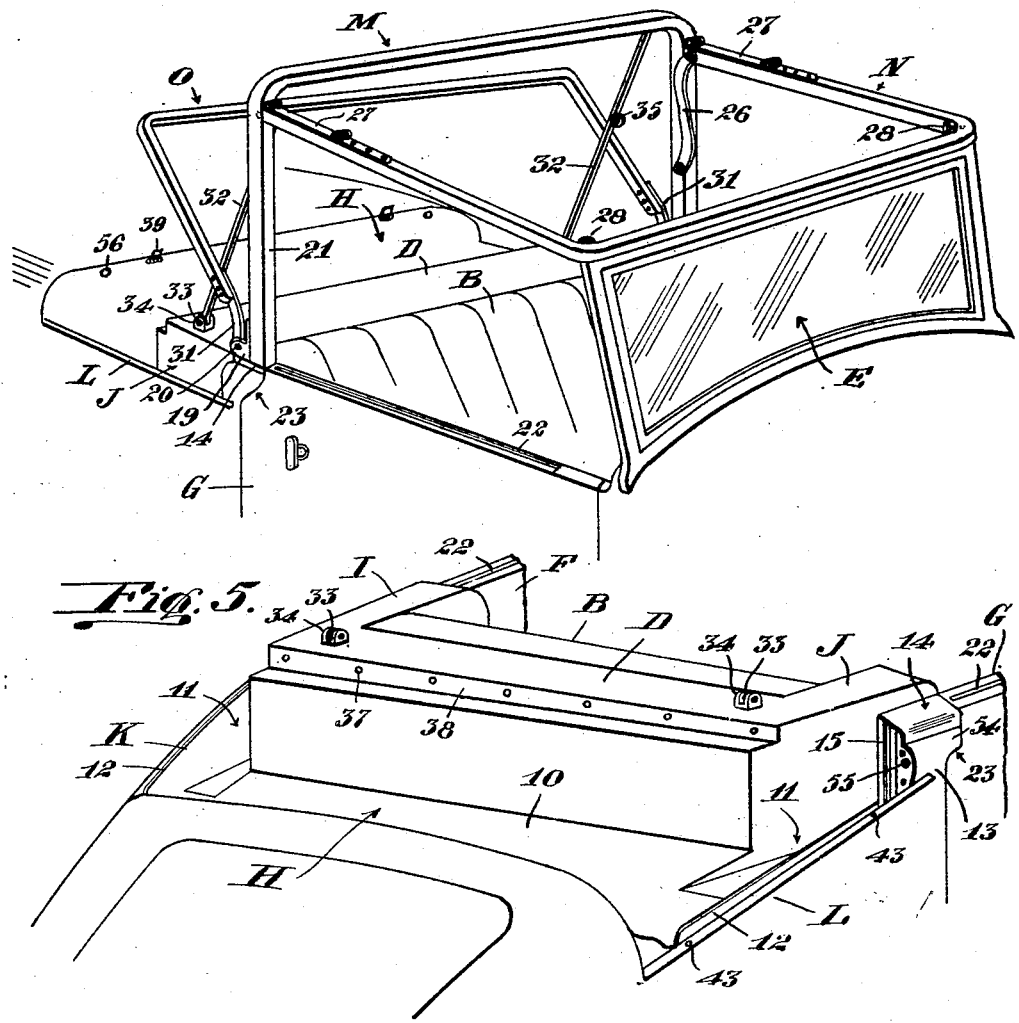

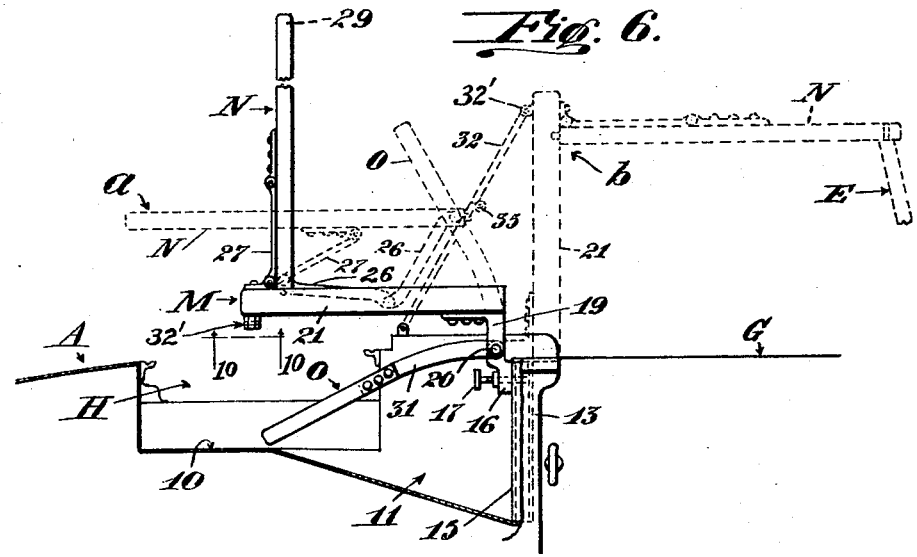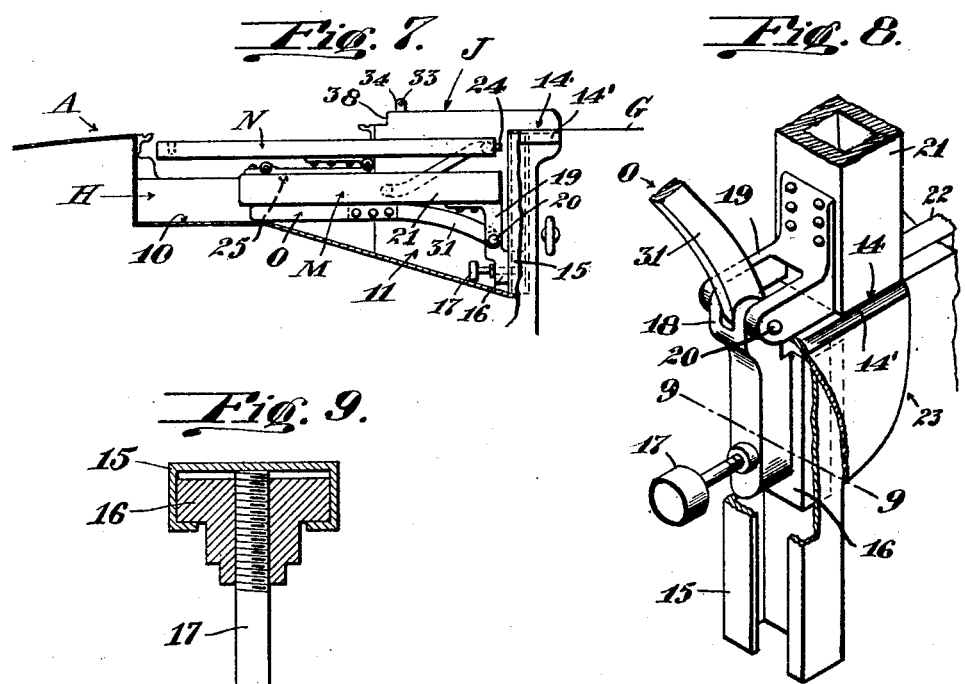

Patented Mar. 17, 1931

1,796,918

UNITED STATES PATENT OFFICE

LA MAR BRESEE, OF LOS ANGELES, CALIFORNIA, ASSIGNOR TO WALTER M. MURPHY COMPANY, OF PASADENA, CALIFORNIA, A CORPORATION OF CALIFORNIA

CONVERTIBLE COUPÉ

Application filed June 18, 1928. Serial No. 286,145.

This invention relates to automobiles and particularly pertains to that class of vehicles known as convertible coupés which embody a top adapted for enclosing a passenger compartment to form an enclosed car and also adapted to be disposed to produce an open car of the roadster type. This invention may be said to reside in parts and arrangement of parts in combination with a car of the roadster type that produces a closed car of the coupé type.

An object of the invention is to provide a construction whereby the vehicle top may be easily and quickly disposed in either an extended or folded position so that the vehicle may readily be converted from an enclosed to an open car or vice versa, and in which the top when folded will be carried within the vehicle body entirely concealed and protected from the weather.

Another object is to provide a construction and arrangement whereby the top, when folded, will be disposed in a compartment in the vehicle body and enclosed therein in such manner as not to present any projections that will detract from the appearance or alter the stream line contour of the vehicle body.

Another object is to provide a collapsible vehicle top with a mounting which will admit of the top when in its open position, being projected entirely above the plane of the upper margin in back of the vehicle seat and when in its folded position, be disposed entirely below said plane so that the folded top may be covered by a closure leading from the upper margin of the seat back and continuing on unbroken lines into the walls of a tonneau.

With the foregoing objects in view, together with such other objects and advantages as may subsequently appear, the invention resides in the parts and features, and in the combination, construction and arrangement of parts, or the equivalents thereof, hereinafter described and claimed and illustrated in the accompanying drawings, showing a preferred embodiment of the invention, in which:

Fig. 1 is a fragmentary side elevation of an automobile of the roadster type, showing the top in place;

Fig. 2 is a top perspective of the same with the top concealed;

Fig. 3 is a perspective view of a detachable body panel which is a feature of my invention as will hereinafter be more fully described;

Fig. 4 is a skeleton perspective of the top, when in place in the open position;

Fig. 5 is a fragmentary top perspective of a portion of the car body, showing the compartment for reception of the top when folded down, and also showing the special mounting for the top;

Fig. 6 is a side elevation of the car with the side partly broken away, showing a skeleton view of the top in solid lines in an intermediate position and depicting in dotted lines, the manner of folding the top, and also showing in dotted lines the position of the top when fully opened.

Fig. 7 is a similar view, showing the top fully collapsed within its receiving compartment;

Fig. 8 is a perspective view of my special mounting upon the car;

Fig. 9 is a view in cross section as seen on line 9—9 of Fig. 8.

Fig. 10 is an enlarged detail in elevation as seen on the line 10—10 of Fig. 6 in the direction indicated by the arrows.

Referring to the drawings more specifically, A indicates generally a vehicle body, which includes a seat B, a tonneau or rear end portion C extending rearwardly of the back D of the seat B, a windshield E and doors F and G.

In carrying out the present invention, the vehicle body is formed with a compartment H extending rearward of the seat back D and projecting along the ends I and J of the seat; this compartment being of general U-shape in plan and embodying a bottom wall 10 extending horizontally from the back wall of the seat back and inclining downwardly contiguous the ends of the seat to form recesses 11 as shown in Figs. 6 and 7.

The ends of the compartment are formed by the side walls K and L of the vehicle body, the upper margins of which are straight longitudinally and have upstanding beads 12 on their inner margins. The back and end walls of the seat form inner side walls of the compartment and the ends of the recesses 11 are formed by columns 13 which constitute jambs against which the doors F and G close. The columns project above the upper margins of the walls K and L and terminate below the top faces of the seat ends to form ledges 14, which are covered by finish plates 14'.

Mounted on each of the columns 13 and facing the compartment, is a guide channel 15 which extends into the recess 11 and is closed at its upper end by the plate 14', and arranged in the guide channel to slide vertically therein is a slide-block 16, in which is threaded a set screw 17 adapted to be brought to bear against the inner wall of the channel to securely clamp the block against movement.

Formed on the upper end of the block 16, is a yoke 18, which is offset to project outwardly from the guide channel and is extended upwardly above the upper end of the block, and extending astride the yoke 18 is a second yoke 19 which is pivotally connected thereto to swing vertically by a pivot pin 20. The yokes 19 are secured to the end or leg portions 21 of a U-shaped bow M of a collapsible top, whereby said bow may be swung vertically in and out of the compartment H; the yokes 19 projecting from the rear face of the bow and being arranged contiguous the ends of the latter in such manner that when the block 16 is in an upper position, the bow may swing to a vertical position with its ends seating on the ledges 14 as shown in Fig. 8.

The yoke 19 and the legs 21 of the bow are so formed that when the legs are seated on the ledges, the front faces of the legs 21 of the bow will extend on a vertical plane substantially flush with the margin of the columns 13 presented to the doors so as to extend contiguous the edge of glass panels or windows 22 slidable vertically in the usual recesses formed in the doors; the front edge of the ledge being extended to project into a cut-away portion 23 in an upper corner of the door so as to determinate contiguous vertical edges of the glass panels, which panels are necessarily slightly narrower than the doors.

The collapsible top, including the bow M, also embodies a top bow N, and a back bow O; the top bow being provided with lugs 24 projecting from the end of each of its legs, which lugs are adapted to be engaged in sockets 25 formed in the upper part of the legs 21 of the bow M. A pair of links 26 are pivotally connected at one end to the legs of the bow M and at the other end to the legs of bow N in such manner that the bow N may be reversed as shown in dotted lines in Fig. 7. Connecting bows M and N is another pair of links 27 pivoted to bow M at a point just above the hole 25 and to the bow N at a point so spaced on its legs that it forces links 26 and 27 to cooperate as parallel links after bow N has been reversed. These two sets of links furnish a lock to hold the bow N securely in its proper position and provide a more stable top when in the up position and also serve as a means to assist in keeping the bows parallel when lowering the top.

The bow N is also equipped with means for attaching each forward corner to the top of the windshield, said means consisting of a set screw 28 suitably mounted within the inside of each forward corner of the bow, which set screw is equipped with a head adapted to be turned by hand. The corners of the bow N are each formed with a hole 29 to receive a pin 30 upstanding at each corner of the windshield. When the top is in place, the set screw 28 is tightened to effect engagement with the pin to rigidly hold the forward edge of the bow N in engagement with the windshield frame.

The bow O has the ends of its legs 31 extending between the members of the yokes 18 and pivotally engaged by the pins 20 so as to be carried on the slide-block 16.

As a further means of holding the top rigid, I provide knee jointed braces 32 universally pivoted at their upper ends to the rear side of the bow N, as indicated at 32', while the other ends are forked and are adapted to detachably fit over pins 33 held in brackets 34, which brackets are suitably mounted on the back of the seat B. To collapse the top, these braces are first bent at the knee joint 35 which withdraws the fork from engagement with the pin 33. The braces then are straightened and since they are universally pivoted at their upper ends to the bow M, they are swung parallel to the top run of the bow M and are folded in with the rest of the top.

When the top is in the up-position, the rear and side parts of the closure 36, which are generally cloth or leather, are held down at their lower edge by snap fasteners 37 which are mounted upon an upstanding shoulder 38 on the back of the seat. This, in effect, provides a closure that is substantially water proof.

The foregoing description deals with the parts and arrangement of parts constituting the top, and with the arrangement of parts on the car body to accommodate it to receive the top in its collapsed position.

To conceal the top, when in the collapsed position and to close the compartment H, both when the top is up or collapsed, a closure panel P is hinged at 39 on the rear margin of the compartment and detachable body panels Q are provided to close each side extension of the compartment. These parts fit together, as will now be described, to produce a smooth, workmanlike appearing car either of the coupé or roadster type.

The panel Q as shown in Fig. 3, is adapted to close the end portions of the compartment H either when the top is up or down and is bent in conformity with the contour of the vehicle body. It is also provided with a lap joint 40 for sealing the outer joint line 41. To insure perfect alignment of this joint, dowel pins 42 are provided which fit into holes 43 in the body of the car. To make a rattle-proof weather-proof joint, the inner margin 44 of the panel that takes the end edge of the closure P is equipped in the usual manner with a rubber sealing strip 44' suitably held in place to serve as a bumper as well as a seal against water and wind.

As a means of detachably locking the panel Q in place, there are provided horizontal bolts 45 and 46 extending in opposite directions from a centrally located vertical shaft 48 fitted at its lower end with a cross bar 49 securely attached thereto, to one end of which the bolt 45 is pivotally attached while bolt 46 is likewise attached to the opposite end. This arrangement provides means for withdrawing the bolts simultaneously. The upper part of the shaft 48 is suitably shaped either to take a square key or a socket wrench 50 or any other similar device for turning sunken bolts or nuts. A spring 51 is connected to the cross-bar 49 to exert a pull thereon to normally dispose the bolts 45 and 46 in their advanced position. The forward end of the panel Q is forked as shown at 52 to extend adjacent the opposite sides of the ledge 14, the outer member 53 of which is adapted to overlie a shoulder 54 on the column 13.

Formed in the column 13 is an opening 55 to receive the bolt 45 and formed in the rear wall of the compartment H is a hole 56 to receive the bolt 46, whereby the cover panel is held in place.

Each cover panel Q is formed with an upstanding shoulder 57, which is designed to afford an extension of the shoulder 38 on the seat back along the seat ends when the panels are in place and which shoulder is provided with snap fasteners 58 to engage companion fasteners on the top cover.

In the operation of the invention, when it is desired to collapse the top, the top cover is disengaged from the fasteners 37 and 58, the hinged closure P is swung upwardly and rearwardly on its hinges 39 and the panels Q are removed on disengaging the bolts 45 and 46 from their keeper openings 55 and 56, thus exposing the compartment H. The joints of the knee braces 32 are broken to disengage the outer ends thereof whereupon these braces are swung to extend along the back of the cross member of the bow M in which position they are secured by suitable fastenings 60 as shown in Fig. 10. The top bow N is then disengaged from the windshield frame on loosening the set screws 28 whereupon the main bow M, together with the back bow O, is swung rearwardly into the position shown in full lines in Fig. 6; the back bow O swinging downwardly into the compartment H and the bow M being swung clear of the ledges 14. The top bow N, on disengaging the lugs 24 from the bow M, is swung to a reversed position on its link connections with the bow M, as indicated by the dotted lines a in Fig. 6, and is lowered against the then substantially horizontally extending bow M.

The set screws 17 on the slide block 16 are then loosened and the slide blocks moved downwardly in the guide channels 15 thus lowering the end portions of the several bows so as to position the bows in their collapsed position within the compartment H.

The panels Q are then replaced and secured in position, whereupon the closure P is restored to its closed position thereby completely enclosing the collapsed top within the compartment H and thus converting the coupé into a roadster as shown in Fig. 2.

When it is desired to restore the top to its extending coupé forming position as shown in Fig. 1, the compartment H is opened and the slide blocks 16 are lifted to their uppermost positions and then secured by the set screws 17 whereupon the bow N is swung on its links and extended at right angles to the bow M with the lugs 24 engaging the latter. The bow M with the bow N thereon, together with the bow O are swung upwardly to the position shown in dotted lines b in Fig. 6, whereupon the bow N is again attached to the windshield frame. The compartment H is then closed as before described and the top cover secured to the fasteners 37 and 58 whereupon the braces 34 are reengaged with the pins 33 to draw the top cover taut.

When the top is in its extended position as shown in Figs. 1 and 4, the glass panels carried by the doors when extended above the latter when the doors are closed will substantially close the space bounded by the doors, windshield frame, and the bows M and N of the top.

While I have shown and described a specific embodiment of my invention, it will be understood that the structure may be subject to modifications to meet varying conditions and accordingly, I do not limit myself to the exact details of construction and arrangement shown but may employ such parts and construction and arrangement of parts, and such equivalents thereof as come within the meaning and scope of the terms of the appended claims.

I claim:

1. In a vehicle of the character described, a vehicle body having a seat and formed with a compartment extending rearwardly of the seat, a pair of vertical guide-ways in said compartment adjacent the ends of the seat, a slide block in each of said guide-ways, means for fastening the guide blocks in elevated positions in said guide-ways, a collapsible vehicle top carried on said guide blocks adapted when collapsed to be positioned within said compartment; said slide blocks being operable to lower the attached portions of the vehicle top into the compartment, ledges on the upper ends of said guide-ways, and a main bow included in said vehicle top pivotally connected to said slide blocks and arranged to seat at its ends on said ledges, when said slide blocks are in their uppermost positions with the vehicle top extended.

2. In a vehicle of the character described, a vehicle body having a seat and formed with a compartment extending rearwardly of the seat, a pair of vertical guide-ways in said compartment adjacent the ends of the seat, a slide block in each of said guide-ways, means for fastening the guide blocks in elevated positions in said guide-ways, a collapsible vehicle top carried on said guide blocks adapted when collapsed to be positioned within said compartment; said slide blocks being operable to lower the attached portions of the vehicle top into the compartment, ledges on the upper ends of said guide-ways, a main bow included in said vehicle top pivotally connected to said slide blocks and arranged to seat at its ends on said ledges when said slide blocks are in their uppermost positions with the vehicle top extended, said bow having leg portions arranged so that when the bow is seated on said ledges the front faces of said leg portions will extend substantially flush with the front margins of said ledges.

3. In a vehicle of the character described, a vehicle body having a seat, hinged doors and vertically slidable windows in said doors; an upwardly opening compartment rearward of said seat, columns adjacent the seat ends constituting door frame members, ledges on the upper ends of said columns over-hanging portions of the upper edges of the doors to extend contiguous the windows in the latter, a vehicle top main bow having legs adapted to seat on said ledges with the forward faces extending substantially in alignment with the forward edges of said ledges to extend contiguous adjacent edges of the door windows, and means whereby said bow may be swung clear of said column and lowered to a point below the upper ends of said columns.

4. In a vehicle of the character described, a vehicle body having a seat, hinged doors and vertically slidable windows in said doors; an upwardly opening compartment rearward of said seat, columns adjacent the seat ends constituting door frame members, ledges on the upper ends of said columns over-hanging portions of the upper edges of the doors to extend contiguous the windows in the latter, a vehicle top main bow having legs adapted to seat on said ledges with the forward faces extending substantially in alignment with the forward edges of said ledges to extend contiguous adjacent edges of the door windows, and a pair of vertical movable slide blocks pivotally carrying said bow member on which the latter may be swung to clear said columns and operable to lower said bow member into said compartment to a point below the upper ends of said columns.

5. In a vehicle of the character described, a vehicle body having a seat, a windshield frame, a pair of vertically movable slide blocks arranged adjacent the ends of the seat, means for fastening said slide blocks in an elevated position, a main vehicle top bow pivoted to swing vertically on said blocks, a rear bow pivoted on said blocks, a top bow, links connecting said top bow to said main bow on which said top bow may be swung to extend either at right angles to said main bow or substantially parallel therewith, means for interconnecting the ends of the top bow to the main bow, and means for detachably connecting said top bow to the vehicle windshield; said slide blocks being operable to lower said bows when in a collapsed position.

6. In a vehicle of the character described, a vehicle body having a seat, a windshield frame, a pair of vertically movable slide blocks arranged adjacent the ends of the seat, means for fastening said slide blocks in an elevated position, a main vehicle top bow pivoted to swing vertically on said blocks, a rear bow pivoted on said blocks, a top bow, links connecting said top bow to said main bow on which said top bow may be swung to extend either at right angles to said main bow of substantially parallel therewith, means for interconnecting the ends of the top bow to the main bow, means for detachably connecting said top bow to the vehicle windshield, said slide blocks being operable to lower said bows when in a collapsed position, and knee braces for extension between the back of the vehicle seat and the main bow when the latter is in an upright position.

7. In a vehicle of the character described, a vehicle body having a seat, a windshield frame, a pair of vertically movable slide blocks arranged adjacent the ends of the seat, means for fastening said slide blocks in an elevated position, a main vehicle top bow pivoted to swing vertically on said blocks, a rear bow pivoted on said blocks, a top bow, links connecting said top bow to said main bow on which said bow may be swung to extend either at right angles to said main bow or substantially parallel therewith, means for interconnecting the ends of the top bow to the main bow, means for detachably connecting said top bow to the vehicle windshield, said slide blocks being operable to lower said bows when in a collapsed position, knee braces for extension between the back of the vehicle seat and the main bow when the latter is in an upright position, and means for detachably connecting one end of each of said knee braces.

8. In a vehicle of the character described, a vehicle body having a top receiving compartment, a pair of vertical guide-ways in said compartment, ledges on the upper ends of said guide-ways, slide blocks movable vertically in said guide-ways, means for securing said slide-blocks in an elevated position, a yoke formed on each of said slide blocks, a pivot pin carried by each of said yokes, a rear top bow pivoted at its ends on said pins, a main top bow, a yoke adjacent and offset from each end of said main bow affixed thereto and pivoted on said pivot pins whereby said main bow may be swung when the slide blocks are elevated to seat the ends of the main bow on said ledges.

9. In a vehicle of the character described, a vehicle body having a top receiving compartment, a pair of vertical guide-ways in said compartment, ledges on the upper ends of said guide-ways, slide blocks movable vertically in said guide-ways, means for securing said slide-blocks in elevated positions, a yoke formed on each of said slide blocks, a pivot pin carried by each of said yokes, a rear top bow pivoted at its ends on said pins, a main top bow, a yoke adjacent and offset from each end of said main bow affixed thereto and pivoted on said pivot pins whereby said main bow may be swung when the slide blocks are elevated to seat the ends of the main bow on said ledges, and means for fastening the main bow with its ends seated on said ledges.

In testimony whereof, I have affixed my signature.

LA MAR BRESEE.